(12) United States Patent
Zheng

(10) Patent No.: US 12,463,806 B2
(45) Date of Patent: Nov. 4, 2025

(54) DATA ENCRYPTION METHOD, DEVICE, COMPUTER DEVICE AND STORAGE MEDIUM

(71) Applicant: SHENZHEN TCL DIGITAL TECHNOLOGY LTD., Guangdong (CN)

(72) Inventor: Wenping Zheng, Guangdong (CN)

(73) Assignee: SHENZHEN TCL DIGITAL TECHNOLOGY LTD., Guangdong (CN)

( * ) Notice: Subject to any disclaimer, the term of this patent is extended or adjusted under 35 U.S.C. 154(b) by 0 days.

(21) Appl. No.: 18/569,615

(22) PCT Filed: Dec. 29, 2022

(86) PCT No.: PCT/CN2022/143253
§ 371 (c)(1),
(2) Date: Dec. 13, 2023

(87) PCT Pub. No.: WO2024/138503
PCT Pub. Date: Jul. 4, 2024

(65) Prior Publication Data
US 2025/0317284 A1    Oct. 9, 2025

(30) Foreign Application Priority Data
Dec. 29, 2022    (CN) .......................... 202211709085.1

(51) Int. Cl.
*H04L 9/08*    (2006.01)
*H04L 9/14*    (2006.01)
(52) U.S. Cl.
CPC .............. *H04L 9/0869* (2013.01); *H04L 9/14* (2013.01)

(58) Field of Classification Search
CPC ................................. H04L 9/0869; H04L 9/14
(Continued)

(56) References Cited

U.S. PATENT DOCUMENTS

2022/0123925 A1    4/2022    Lee
2022/0337566 A1*   10/2022   Hill ..................... H04L 63/0435
2025/0211435 A1*   6/2025    Maji ....................... H04L 9/008

FOREIGN PATENT DOCUMENTS

CN    107948213 A    4/2018
CN    113762971 A    12/2021
(Continued)

OTHER PUBLICATIONS

International Search Report in International application No. PCT/CN2022/143253, mailed on Jun. 16, 2023.
(Continued)

*Primary Examiner* — Jacob Lipman
(74) *Attorney, Agent, or Firm* — Nathan & Associates Patent Agents Ltd.; Menachem Nathan

(57) ABSTRACT

A data encryption method includes obtaining a random number set and a data mapping information, mapping the random numbers in the random number set based on the data mapping information to obtain a first encryption key, obtaining a data description information of data to be encrypted, and performing operations on the data description information based on the first encryption key to obtain an encrypted description information, mapping the data description information based on the data mapping information to obtain a second encryption key, using the first encryption key and the second encryption key to perform operations on the data to be encrypted to obtain an initial encrypted data, and generating an encrypted data corresponding to the data to be encrypted based on the random number set, the encrypted description information, and the initial encrypted data.

20 Claims, 3 Drawing Sheets

(58) Field of Classification Search
USPC .......................................................... 713/171
See application file for complete search history.

(56) References Cited

FOREIGN PATENT DOCUMENTS

| | | | |
|---|---|---|---|
| CN | 114491637 | A | 5/2022 |
| CN | 115039376 | A | 9/2022 |
| JP | 2020187241 | A | 11/2020 |

OTHER PUBLICATIONS

Written Opinion of the International Search Authority in International application No. PCT/CN2022/143253, mailed on Jun. 16, 2023.

* cited by examiner

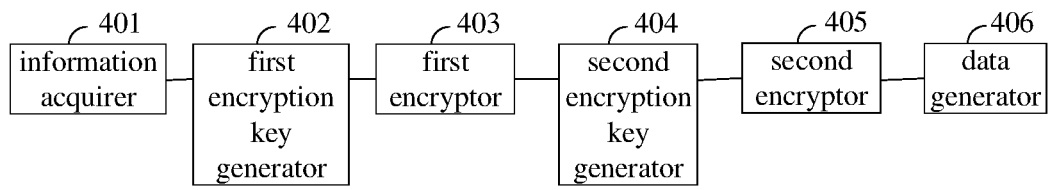
FIG. 3
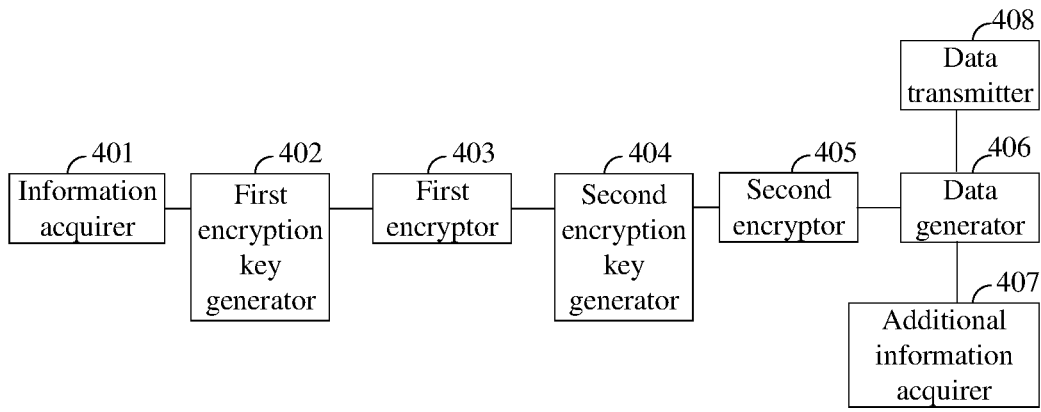
FIG. 4
FIG. 5

DATA ENCRYPTION METHOD, DEVICE, COMPUTER DEVICE AND STORAGE MEDIUM

CROSS REFERENCE TO RELATED APPLICATIONS

This application is a US national phase application based upon an International Application No. PCT/CN2022/143253, filed on Dec. 29, 2022, and this application claims priority to Chinese Patent Application No. 202211709085.1, filed on Dec. 29, 2022, and entitled "DATA ENCRYPTION METHOD, DEVICE, COMPUTER DEVICE AND STORAGE MEDIUM". The entire disclosures of the above application are incorporated herein by reference.

TECHNICAL FIELD

The present invention relates to the technical field of data processing, in particular to a data encryption method, device, computer device and storage medium.

BACKGROUND

With the rapid development of current technologies, the demand for data transmission between different devices is getting higher and higher. Further, the data security issue in the data transmission process is more and more paid attention to by people.

At present, if the data is not encrypted when the data is transmitted, or a simple encryption method is adopted, the security of the data cannot be guaranteed. However, if a complex encryption algorithm is used to process the data, a large amount of computing resources may be occupied, and the calculation may take a long time, which may affect the efficiency of data transmission.

SUMMARY OF INVENTION

Technical Problem

In the prior art, the security of data cannot be guaranteed or requires a large amount of computing resources, and the computation takes a long time, which affects the efficiency of data transmission.

Problem Solution

Technical Solution

Embodiments of the present invention provide a data encryption method, device, computer device, and storage medium, which can enhance data security during data transmission.

Embodiments of the present invention provide a data encryption method, comprising:
  obtaining a random number set and a data mapping information, wherein the random number set comprises a plurality of random numbers, and the data mapping information is determined based on a preset device information of an electronic device;
  mapping the random numbers in the random number set based on the data mapping information to obtain a first encryption key;
  obtaining a data description information of data to be encrypted, and performing operations on the data description information based on the first encryption key to obtain an encrypted description information;
  mapping the data description information based on the data mapping information to obtain a second encryption key;
  using the first encryption key and the second encryption key to perform operations on the data to be encrypted to obtain an initial encrypted data; and
  generating an encrypted data corresponding to the data to be encrypted based on the random number set, the encrypted description information, and the initial encrypted data.

Correspondingly, embodiments of the present invention further provide a data encryption device, comprising:
  an information acquirer configured to obtain a random number set and a data mapping information, wherein the random number set comprises a plurality of random numbers, and the data mapping information is determined based on a preset device information of an electronic device;
  a first encryption key generator configured to map the random numbers in the random number set based on the data mapping information to obtain a first encryption key;
  a first encryptor configured to obtain a data description information of data to be encrypted, and perform operations on the data description information based on the first encryption key to obtain an encrypted description information;
  a second encryption key generator configured to map the data description information based on the data mapping information to obtain a second encryption key;
  a second encryptor configured to use the first encryption key and the second encryption key to perform operations on the data to be encrypted to obtain an initial encrypted data; and
  a data generator configured to generate an encrypted data corresponding to the data to be encrypted based on the random number set, the encrypted description information, and the initial encrypted data.

Optionally, the information acquirer is configured to: obtain a data encryption time of the data to be encrypted, and generate a random number sequence based on the data encryption time; and
  select a target random number from the random number sequence based on a preset random number selection rule to generate the random number set.

Optionally, the data to be encrypted comprises at least one data packet to be encrypted, and the data description information comprises a data packet identifier of the data packet to be encrypted;
  wherein the second encryption key generator is configured to: from the data to be encrypted, determine a target data packet to be encrypted that is currently being encrypted; and
  map the data packet identifier of the target data packet to be encrypted based on the data mapping information to obtain the second encryption key corresponding to the target data packet to be encrypted;
  wherein the second encryptor is configured to: perform operation on the target data packet to be encrypted by using the first encryption key and the second encryption key to obtain the initial encrypted data packet;
  return to the operation of from the data to be encrypted, determining the target data packet to be encrypted that is currently being encrypted until all the data packets to be encrypted in the data to be encrypted correspond to a location of the initial encrypted data package; and generate the initial encrypted data based on each of the initial encrypted data packets.

Optionally, embodiments of the present invention further comprise an additional information acquirer configured to count a data length of the data to be encrypted, and obtaining a preset transmission test information;

wherein the data generator is configured to perform information splicing based on the random number set, the encrypted description information, the initial encrypted data, the data length, and the transmission test information to generate the encrypted data corresponding to the data to be encrypted.

Optionally, embodiments of the present invention further comprise a data transmitter configured to transmit the encrypted data to a data receiving device to trigger the data receiving device to decrypt the encrypted description information and the initial encrypted data based on the random number set in the encrypted data to obtain the data to be encrypted.

Optionally, the first encryption key generator is configured to: determine a bit value sequence corresponding to the random numbers in the random number set;

divide the bit value sequence based on a number of bytes of the data mapping information to obtain at least one bit value subsequence; and calculate a mapping value corresponding to each bit value subsequence, select the data mapping sub-information under the byte corresponding to the mapping value from the data mapping information, and generate the first encryption key.

Optionally, the first encryption key comprises at least one byte of first encryption key data, and the data description information comprises at least one byte of description information data;

the first encryptor is configured to: perform XOR calculation on the first encryption key data of each byte in the first encryption key and the description information data in each byte of the data description information to obtain an XOR operation result; and generate the encrypted description information based on the XOR operation result.

Correspondingly, embodiments of the present invention further provide a computer device comprising a memory and a processor; wherein the memory stores an application program, and the processor is configured to run the application program in the memory to perform any one of the operations in the data encryption method of embodiments of the present invention.

Correspondingly, embodiments of the present invention further provide a computer-readable storage medium, wherein the computer-readable storage medium stores a plurality of instructions, and the instructions are suitable for being loaded by a processor to perform any one of the operations in the data encryption method of embodiments of the present invention.

Correspondingly, embodiments of the present invention further provide a computer program product comprising computer programs or instructions, wherein the computer programs or instructions are executed by a processor to perform any one of the operations in the data encryption method of embodiments of the present invention.

Beneficial Effect of the Invention

Beneficial Effect

Beneficial effect: Compared with the prior art, the present invention provides a data encryption method, which can obtain a random number set and a data mapping information, wherein the random number set comprises a plurality of random numbers, and the data mapping information is determined based on a preset device information of an electronic device, map the random numbers in the random number set based on the data mapping information to obtain a first encryption key, obtain a data description information of data to be encrypted, and perform operations on the data description information based on the first encryption key to obtain an encrypted description information, map the data description information based on the data mapping information to obtain a second encryption key, use the first encryption key and the second encryption key to perform operations on the data to be encrypted to obtain an initial encrypted data, and generate an encrypted data corresponding to the data to be encrypted based on the random number set, the encrypted description information, and the initial encrypted data. Because in the embodiments of the present invention, the encryption key can be calculated based on the data mapping information related to the specific computer device, the data to be encrypted and the data description information are both encrypted by the encryption key. Therefore, the security of data during data transmission can be enhanced.

BRIEF DESCRIPTION OF THE DRAWINGS

Description of Drawings

In order to illustrate the technical solutions in the embodiments of the present invention more clearly, the following will briefly introduce the drawings that need to be used in the description of the embodiments. Obviously, the drawings in the following description are only some embodiments of the present invention. For those skilled in the art, other drawings can also be obtained based on these drawings without any creative effort.

Figure 1:
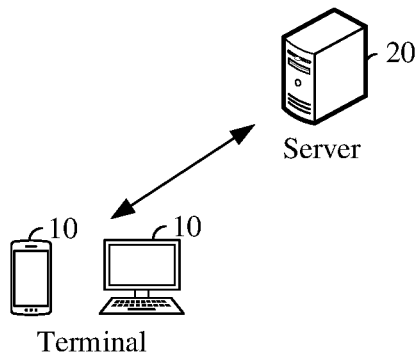

FIG. 1 is a schematic diagram of a scenario of a data encryption method provided by an embodiment of the present invention.

Figure 2:
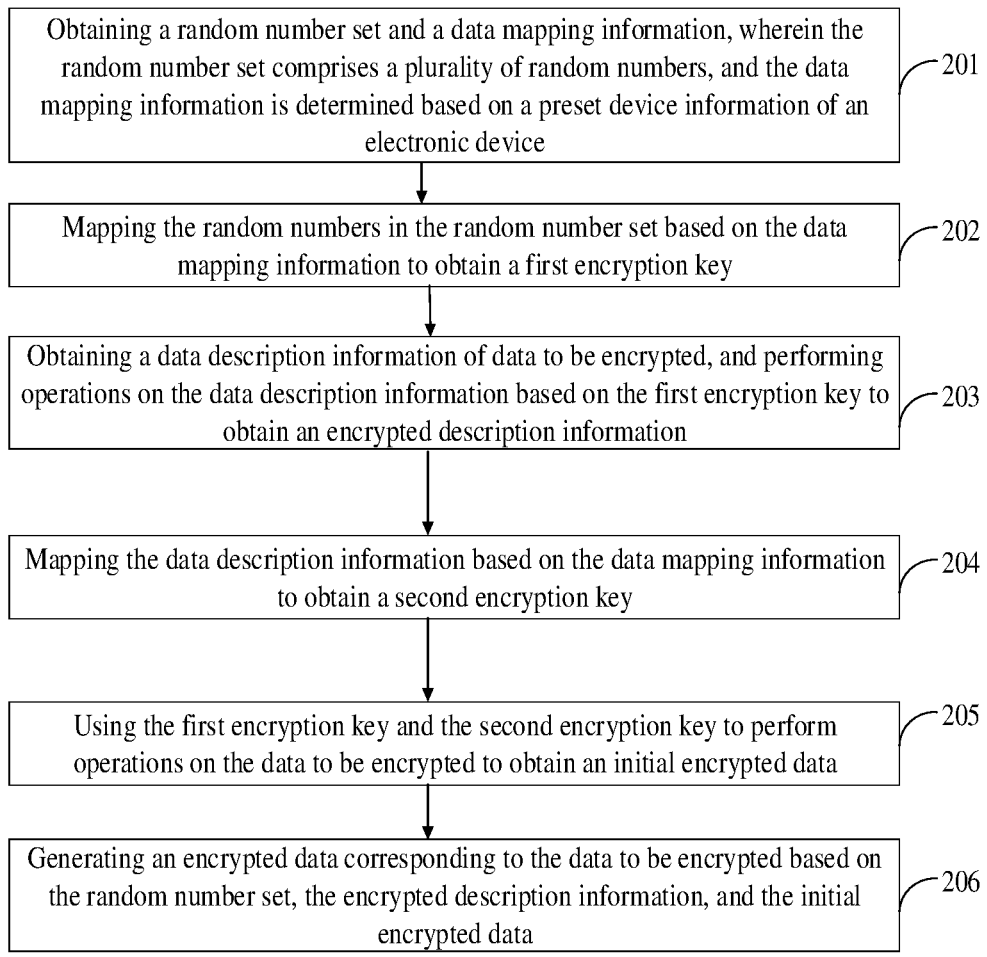

FIG. 2 is a flowchart of a data encryption method provided by an embodiment of the present invention.

FIG. 3 is a schematic diagram of data composition of encrypted data provided by an embodiment of the present invention.

FIG. 4 is a schematic structural diagram of a data encryption device provided by an embodiment of the present invention.

FIG. 5 is another schematic structural diagram of a data encryption device provided by an embodiment of the present invention.

Figure 6:
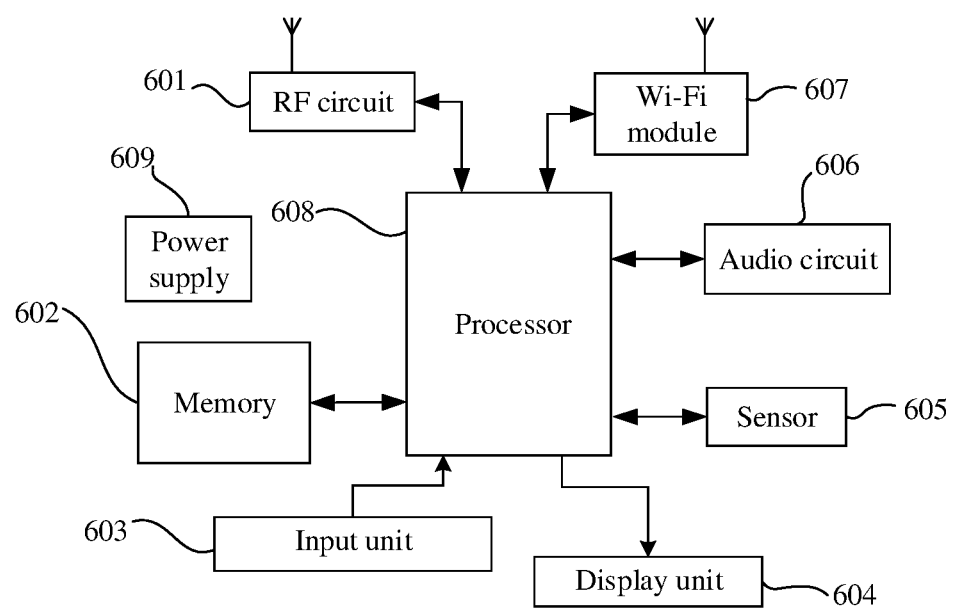

FIG. 6 is a schematic structural diagram of a computer device provided by an embodiment of the present invention.

DETAILED DESCRIPTION OF THE PREFERRED EMBODIMENTS

Embodiments of the Present Invention

The following will clearly and completely describe the technical solutions in the embodiments of the present invention with reference to the drawings in the embodiments of the present invention. Apparently, the described embodiments are only some of the embodiments of the present invention, but not all of them. Based on the embodiments of the present invention, all other embodiments obtained by those skilled in the art without creative efforts fall within the protection scope of the present invention.

Embodiments of the present invention provide a data encryption method, device, computer device, and computer-readable storage medium. Specifically, embodiments of the present invention provide a data encryption method suitable for a data encryption device, and the data encryption device can be integrated into a computer device.

The computer device may be a terminal or other device, including but not limited to a mobile terminal and a fixed terminal. For example, mobile terminals include, but are not limited to, smart phones, smart watches, tablet computers, notebook computers, and smart vehicles. Fixed terminals include but are not limited to desktop computers, smart TVs, etc.

The computer device may also be a device such as a server. The server can be a stand-alone physical server. The server may also be a server cluster or a distributed system composed of multiple physical servers. The server can also a cloud server for basic cloud computing services providing cloud service, cloud database, cloud computing, cloud function, cloud storage, network service, cloud communication, middleware service, domain name service, security service, CDN (content delivery network), and big data and artificial intelligence platforms, but are not limited to this.

The data encryption method in the embodiment of the present invention may be implemented by the server, or jointly implemented by the terminal and the server.

The method is described below by taking the terminal and the server jointly implementing the data encryption method as an example.

As shown in FIG. 1, the data encryption system provided by the embodiment of the present invention includes a terminal 10, a server 20, and the like. The terminal 10 is connected to the server 20 through a network, for example, through a wired or wireless network connection. The terminal 10 may exist as a terminal that transmits data to the server 20.

The terminal 10 can be configured to obtain a random number set and a data mapping information, wherein the random number set comprises a plurality of random numbers, and the data mapping information is determined based on a preset device information of an electronic device, map the random numbers in the random number set based on the data mapping information to obtain a first encryption key, obtain a data description information of data to be encrypted, and perform operations on the data description information based on the first encryption key to obtain an encrypted description information, map the data description information based on the data mapping information to obtain a second encryption key, use the first encryption key and the second encryption key to perform operations on the data to be encrypted to obtain an initial encrypted data, and generate an encrypted data corresponding to the data to be encrypted based on the random number set, the encrypted description information, and the initial encrypted data.

The server 20 may receive the encrypted data sent by the terminal 10. Based on the first encryption key and the second encryption key in the encrypted data, the server 20 performs data decryption on the encrypted description information and the initial encrypted data to obtain the data to be encrypted.

It can be understood that the data encryption operation performed by the terminal 10 may also be performed by the server 20, which is not limited in this embodiment of the present invention.

Each will be described in detail below. It should be noted that the description sequence of the following embodiments is not intended to limit the preferred sequence of the embodiments.

Embodiments of the present invention will be described from the perspective of a data encryption device, and the data encryption device may specifically be integrated in a server or a terminal.

As shown in FIG. 2, the specific flow of the data encryption method of the present embodiment can be as follows:

Operation 201: Obtain a random number set and a data mapping information, wherein the random number set comprises a plurality of random numbers, and the data mapping information is determined based on a preset device information of an electronic device.

A set of random numbers is a set of at least one random number. The embodiment of the present invention does not limit the size and quantity of random numbers. For example, there may be only one random number in the set of random numbers. The random number needs to occupy 4 bytes of storage space. Alternatively, there may be multiple random numbers in the random number set. The sum of the random numbers needs to occupy 4 bytes of storage space, and so on.

The data mapping information is used to map specific information to obtain a key corresponding to the specific information. For example, the data mapping information may map a set of random numbers to obtain a first encryption key and the like.

Specifically, the data mapping information may be related to device information of an electronic device performing data encryption. Alternatively, the data mapping information may be related to the device information of the electronic device receiving the encrypted data.

For example, the data mapping information may be the MAC address and/or serial number of the electronic device, and the like. The embodiment of the present invention does not limit the size and form of the data mapping information. For example, the data mapping information may be an array of sixteen bytes, and so on.

In some optional embodiments, the random numbers in the random number set may be generated using information such as time as a random number seed. That is to say, the operation "obtaining a set of random numbers" may specifically include:
  obtaining the data encryption time of the data to be encrypted, and generating a random number sequence based on the data encryption time; and
  selecting a target random number from the random number sequence according to a preset random number selection rule to generate a random number set.

For example, use the srand((unsigned)time(NULL)) function to generate a random number sequence, and then use the Rand( ) function to select a target random number from the random number sequence.

In other optional embodiments, the random number sequence may also be generated according to the current process handle, the current process ID number, and the like.

Operation 202: Map the random numbers in the random number set based on the data mapping information to obtain a first encryption key.

Specifically, when mapping, the random number may be re-expressed with data mapping information.

In some optional embodiments, the data mapping information may include a data mapping sub-information of at least one byte, and the operation of "mapping the random numbers in the random number set based on the data mapping information to obtain the first encryption key", specifically may include:

determining a bit value sequence corresponding to the random numbers in the random number set;

dividing the bit value sequence based on a number of bytes of the data mapping information to obtain at least one bit value subsequence; and calculating a mapping value corresponding to each bit value subsequence, selecting the data mapping sub-information under the byte corresponding to the mapping value from the data mapping information, and generating the first encryption key.

For example, the random number can be 4 bytes. That is, a sequence of 32-bit bit values. The data mapping information can be an array of 16 bytes (0-15). When dividing, the 32-bit bit value sequence can be divided into 8 4-bit bit value sub-sequences.

If the value corresponding to a bit value subsequence is 1111. The mapping value of the bit value subsequence is calculated to be 15. The data of the 16th byte in the data mapping information can be used as a byte key. Finally, an 8-byte first encryption key can be generated.

Operation 203: Obtain a data description information of data to be encrypted, and perform operations on the data description information based on the first encryption key to obtain an encrypted description information.

The data description information may be packet header information of the data to be encrypted. For example, the data description information may include, but not limited to, the number of FEC original packets and redundant packets, the serial number of FEC serial packets and the serial numbers of sub-packets extracted by FEC, and so on.

Specifically, the encrypted description information can be obtained through XOR calculation. For example, the first encryption key comprises at least one byte of first encryption key data, and the data description information comprises at least one byte of description information data. The operation of "operating the data description information according to the first encryption key to obtain the encrypted description information" may specifically include:

performing XOR calculation on the first encryption key data of each byte in the first encryption key and the description information data in each byte of the data description information to obtain an XOR operation result; and generating the encrypted description information based on the XOR operation result.

Take the data description information as an example, including the four bytes of the number of FEC original packets, the number of redundant packets, the FEC serial number of the packet, and the serial number of the sub-packets extracted by the FEC. During specific encryption, these four bytes can be XORed with the first four bytes of the first encryption key respectively to obtain the encrypted description information.

Operation 204: Map the data description information based on the data mapping information to obtain a second encryption key.

Specifically, when mapping, part or all of the information in the data description information may be mapped.

It should be noted that, the manner of mapping the second encryption key may be the same as that of the first encryption key or may be different from the first encryption key. Optionally, the data description information may include a serial number of a sub-packet of the data to be encrypted, and the operation 204 may include:

determining a bit value sequence of the serial number of the sub-packet;

dividing the bit value sequence based on a number of bytes of the data mapping information to obtain at least one bit value subsequence; and calculating a mapping value corresponding to each bit value subsequence, selecting the data mapping sub-information under the byte corresponding to the mapping value from the data mapping information, and generating the second encryption key.

For example, a two-byte key can be obtained according to a one-byte sub-packet serial number 4 bit*2 and data mapping information. That is, the second encryption key.

Operation 205: Use the first encryption key and the second encryption key to perform operations on the data to be encrypted to obtain an initial encrypted data.

Specifically, the encryption method of the data after the initial encryption may also be XOR calculation of the first encryption key and the second encryption key with the data to be encrypted.

That is, the first encryption key includes at least one byte of first encryption key data. The second encryption key includes at least one byte of second encryption key data. The operation 205 may specifically include: performing XOR calculation on the first encryption key data of each byte in the first encryption key and the second encryption key data of each byte in the second encryption key respectively with the data of each byte in the data to be encrypted to obtain the XOR operation result; and generating the encrypted description information based on the XOR operation result.

Specifically, when performing the XOR calculation, one byte of data in the data to be encrypted may be sequentially targeted. Exclusive OR is performed on the first encryption key data and the second encryption key data of each byte respectively. Record all XOR results as the initial XOR operation result of the byte's data. Finally, according to the initial XOR operation result of all bytes, the XOR operation result is obtained.

Alternatively, when performing XOR calculation, the encryption key may be obtained by concatenating the first encryption key data and the second encryption key data of each byte. The data of each byte in the data to be encrypted is XORed with the encryption key data of the corresponding byte in the encryption key such as the data of the third byte in the data to be encrypted, i.e., XOR with the encryption key data of the third byte in the encryption key, etc.

Optionally, the data to be encrypted may include at least one data packet to be encrypted. The data description information may include a data packet identifier of the data packet to be encrypted. The operation of "mapping the data description information according to the data mapping information to obtain the second encryption key", including:

from the data to be encrypted, determining a target data packet to be encrypted that is currently being encrypted; and mapping the data packet identifier of the target data packet to be encrypted based on the data mapping information to obtain the second encryption key corresponding to the target data packet to be encrypted;

Correspondingly, the operation of "using the first encryption key and the second encryption key to perform the operations on the data to be encrypted to obtain the initial encrypted data" includes:

performing operation on the target data packet to be encrypted by using the first encryption key and the second encryption key to obtain the initial encrypted data packet;

returning to the operation of from the data to be encrypted, determining the target data packet to be encrypted that is currently being encrypted until all the data packets to be encrypted in the data to be encrypted correspond to a location of the initial encrypted data package; and generating the initial encrypted data based on each of the initial encrypted data packets.

That is when the data to be encrypted has multiple sub-packets, it is necessary to calculate the second encryption key for each sub-packet, and then encrypt the data in each sub-packet.

Operation 206: Generate an encrypted data corresponding to the data to be encrypted based on the random number set, the encrypted description information, and the initial encrypted data.

For example, the encrypted data may be obtained by directly concatenating the random number set, the encrypted description information, and the initial encrypted data in sequence.

Optionally, the encrypted data may also include other information, before the operation of "generating the encrypted data corresponding to the data to be encrypted based on the random number set, the encrypted description information, and the initial encrypted data", the data encryption method provided by the embodiment of the present invention may also include:

counting a data length of the data to be encrypted, and obtaining a preset transmission test information;

Correspondingly, the operation of "generating the encrypted data corresponding to the data to be encrypted based on the random number set, the encrypted description information, and the initial encrypted data" includes:

performing information splicing based on the random number set, the encrypted description information, the initial encrypted data, the data length, and the transmission test information to generate the encrypted data corresponding to the data to be encrypted.

For example, the transmission condition test information may be 0x55, 0xAA. The final encrypted data can include header (0x55, 0xAA)+data length (two bytes)+random number (four bytes)+encrypted data (N bytes)+CRC32 (four bytes).

As shown in FIG. 3, the encrypted data may also include CRC32, and so on.

It can be understood that, generating the encrypted data may send the encrypted data to a corresponding device, and the data encryption method provided by the embodiment of the present invention may further include:

transmitting the encrypted data to a data receiving device, triggering the data receiving device to decrypt the encrypted description information and the initial encrypted data based on the random number set in the encrypted data to obtain the data to be encrypted.

As can be seen from the above, the embodiment of the present invention can obtain a random number set and a data mapping information, wherein the random number set comprises a plurality of random numbers, and the data mapping information is determined based on a preset device information of an electronic device, map the random numbers in the random number set based on the data mapping information to obtain a first encryption key, obtain a data description information of data to be encrypted, and perform operations on the data description information based on the first encryption key to obtain an encrypted description information, map the data description information based on the data mapping information to obtain a second encryption key, use the first encryption key and the second encryption key to perform operations on the data to be encrypted to obtain an initial encrypted data, and generate an encrypted data corresponding to the data to be encrypted based on the random number set, the encrypted description information, and the initial encrypted data. Because in the embodiments of the present invention, the encryption key can be calculated based on the data mapping information related to the specific computer device, the data to be encrypted and the data description information are both encrypted by the encryption key. Therefore, the security of data during data transmission can be enhanced.

In order to better implement the above method, correspondingly, an embodiment of the present invention further provides a data encryption device.

Referring to FIG. 4, the data encryption device includes:

an information acquirer 401 configured to obtain a random number set and a data mapping information, wherein the random number set comprises a plurality of random numbers, and the data mapping information is determined based on a preset device information of an electronic device;

a first encryption key generator 402 configured to map the random numbers in the random number set based on the data mapping information to obtain a first encryption key;

a first encryptor 403 configured to obtain a data description information of data to be encrypted, and perform operations on the data description information based on the first encryption key to obtain an encrypted description information;

a second encryption key generator 404 configured to map the data description information based on the data mapping information to obtain a second encryption key;

a second encryptor 405 configured to use the first encryption key and the second encryption key to perform operations on the data to be encrypted to obtain an initial encrypted data; and a data generator 406 configured to generate an encrypted data corresponding to the data to be encrypted based on the random number set, the encrypted description information, and the initial encrypted data.

In some optional embodiments, the information acquirer 401 is configured to: obtain a data encryption time of the data to be encrypted, and generate a random number sequence based on the data encryption time; and select a target random number from the random number sequence based on a preset random number selection rule to generate the random number set.

In some optional embodiments, the data to be encrypted comprises at least one data packet to be encrypted, and the data description information comprises a data packet identifier of the data packet to be encrypted;

the second encryption key generator 404 is configured to: from the data to be encrypted, determine a target data packet to be encrypted that is currently being encrypted; and map the data packet identifier of the target data packet to be encrypted based on the data mapping information to obtain the second encryption key corresponding to the target data packet to be encrypted;

the second encryptor is configured to: perform operation on the target data packet to be encrypted by using the first encryption key and the second encryption key to obtain the initial encrypted data packet;

return to the operation of from the data to be encrypted, determining the target data packet to be encrypted that is currently being encrypted until all the data packets to be encrypted in the data to be encrypted correspond to a location of the initial encrypted data package; and generate the initial encrypted data based on each of the initial encrypted data packets.

In some optional embodiments, referring to FIG. 5, embodiments of the present invention further include an additional information acquirer 407 configured to count a data length of the data to be encrypted, and obtaining a preset transmission test information;

the data generator 406 is configured to perform information splicing based on the random number set, the encrypted description information, the initial encrypted data, the data length, and the transmission test information to generate the encrypted data corresponding to the data to be encrypted.

In some optional embodiments, embodiments of the present invention further include a data transmitter 408 configured to transmit the encrypted data to a data receiving device to trigger the data receiving device to decrypt the encrypted description information and the initial encrypted data based on the random number set in the encrypted data to obtain the data to be encrypted.

In some optional embodiments, the first encryption key generator 402 is configured to: determine a bit value sequence corresponding to the random numbers in the random number set;

divide the bit value sequence based on a number of bytes of the data mapping information to obtain at least one bit value subsequence; and calculate a mapping value corresponding to each bit value subsequence, select the data mapping sub-information under the byte corresponding to the mapping value from the data mapping information, and generate the first encryption key.

In some optional embodiments, the first encryption key comprises at least one byte of first encryption key data, and the data description information comprises at least one byte of description information data;

the first encryptor 403 is configured to: perform XOR calculation on the first encryption key data of each byte in the first encryption key and the description information data in each byte of the data description information to obtain an XOR operation result; and generate the encrypted description information based on the XOR operation result.

As can be seen from the above, the data encryption device can obtain a random number set and a data mapping information, wherein the random number set comprises a plurality of random numbers, and the data mapping information is determined based on a preset device information of an electronic device, map the random numbers in the random number set based on the data mapping information to obtain a first encryption key, obtain a data description information of data to be encrypted, and perform operations on the data description information based on the first encryption key to obtain an encrypted description information, map the data description information based on the data mapping information to obtain a second encryption key, use the first encryption key and the second encryption key to perform operations on the data to be encrypted to obtain an initial encrypted data, and generate an encrypted data corresponding to the data to be encrypted based on the random number set, the encrypted description information, and the initial encrypted data. Because in the embodiment of the present invention, the encryption key can be calculated based on the data mapping information related to the specific computer device, the data to be encrypted and the data description information are both encrypted by the encryption key. Therefore, the security of data during data transmission can be enhanced.

In addition, embodiments of the present invention further provide a computer device. The computer device can be a terminal or a server, etc., as shown in FIG. 6, which shows a schematic structural diagram of the computer device involved in the embodiment of the present invention, specifically:

The computer device may include a radio frequency (RF) circuit 601, a memory 602 including one or more computer-readable storage media, an input unit 603, a display unit 604, a sensor 605, an audio circuit 606, a wireless fidelity (Wi-Fi) module 607, a processor 608 including one or more processing cores, and a power supply 609 and other components. Those skilled in the art can understand that the structure of the computer device shown in FIG. 6 is not limited to the computer device and may include more or less components than shown in the figure, or combine some components, or arrange different components.

The RF circuit 601 can be used for sending and receiving information or receiving and sending signals during a call. In particular, after the downlink information of the base station is received, it is handed over to one or more processors 608 for processing. In addition, data related to uplink is sent to the base station. Generally, the RF circuit 601 includes but is not limited to an antenna, at least one amplifier, a tuner, one or more oscillators, a Subscriber Identity Module (SIM) card, a transceiver, a coupler, a low noise amplifier (LNA), duplexer, etc. In addition, the RF circuit 601 can also communicate with networks and other devices through wireless communication. Wireless communication can use any communication standard or protocol, including but not limited to Global System of Mobile Communication (GSM), General Packet Radio Service (GPRS), Code Division Multiple Access (CDMA), Wideband Code Division Multiple Access (WCDMA), Long Term Evolution (LTE), email, Short Messaging Service (SMS), etc.

The memory 602 can be used to store software programs as well as modules. The processor 608 executes various functional applications and data processing by running software programs and modules stored in the memory 602. The memory 602 may mainly include a storage program area and a storage data area. The storage program area can store an operating system, an application program required by at least one function (such as a sound playing function, an image playing function, etc.), and the like. The storage data area can store data created according to the use of the computer device (such as audio data, phonebook, etc.) and the like. In addition, the memory 602 may include a high-speed random access memory, and may also include a non-volatile memory, such as at least one magnetic disk storage device, flash memory device, or other volatile solid-state storage devices. Correspondingly, the memory 602 may further include a memory controller to provide access to the memory 602 by the processor 608 and the input unit 603.

The input unit 603 can be used to receive input numbers or character information, and generate keyboard, mouse, joystick, optical or trackball signal input related to user settings and function control. Specifically, in a specific embodiment, the input unit 603 may include a touch-sensitive surface as well as other input devices. A touch-sensitive surface, also known as a touch display or trackpad, collects the user's touch on or near it (for example, the user uses a finger, stylus, etc. any suitable object or accessory on the touch-sensitive surface or on the touch-sensitive surface. operation near the surface) and drive the corresponding connection device according to the preset program. Optionally, the touch-sensitive surface may include two parts: a touch detection device and a touch controller. The touch detection device detects the orientation of the user's touch, detects the signal brought by the touch operation, and transmits the signal to the touch controller. The touch controller receives touch information from the touch detection device, converts it into touch point coordinates, and then sends it to the processor 608, and can receive and execute commands sent by the processor 608. In addition, touch-sensitive surfaces can be implemented in various types such as resistive, capacitive, infrared, and surface acoustic wave. In addition to touch-sensitive surfaces, the input unit 603 may also include other input devices. Specifically, other input devices may include, but are not limited to, one or more of physical keyboards, function keys (such as volume control keys, switch keys, etc.), trackballs, mice, joysticks, and the like.

The display unit 604 can be used to display information input by the user or provided to the user, as well as various graphical user interfaces of the computer device. These graphical user interfaces can be composed of graphics, text, icons, videos and any combination thereof. The display unit 604 may include a display panel. Optionally, the display panel may be configured in a liquid crystal display (LCD, Liquid Crystal Display), an organic light-emitting diode (OLED, Organic Light-Emitting Diode), and the like. Further, the touch-sensitive surface can cover the display panel. When the touch-sensitive surface detects a touch operation on or near it, it is sent to the processor 608 to determine the type of the touch event. Then, the processor 608 provides corresponding visual output on the display panel according to the type of the touch event. Although in FIG. 6, the touch-sensitive surface and the display panel are used as two independent components to realize input and input functions. In some embodiments, however, the touch-sensitive surface can be integrated with the display panel for input and output functions.

The computer device may also include at least one sensor 605, such as a light sensor, motion sensor, and other sensors. Specifically, the light sensor may include an ambient light sensor and a proximity sensor. The ambient light sensor can adjust the brightness of the display panel according to the brightness of the ambient light. The proximity sensor can turn off the display panel and/or backlight when the computer device is moved to the ear. As a kind of motion sensor, the gravity acceleration sensor can detect the magnitude of acceleration in all directions (generally three axes). It can detect the magnitude and direction of gravity when it is stationary, and can be used for applications that recognize the posture of the mobile phone (such as horizontal and vertical screen switching, related games, magnetometer posture calibration), vibration recognition related functions (such as pedometer, tap), etc. As for other sensors such as gyroscopes, barometers, hygrometers, thermometers, and infrared sensors that can also be configured by the computer equipment, details will not be repeated here.

The audio circuitry 606, speakers, and microphones may provide an audio interface between the user and the computer device. The audio circuit 606 can transmit the electrical signal converted from the received audio data to the speaker, and the speaker converts it into an audio signal for output. On the other hand, the microphone converts the collected sound signal into an electrical signal, which is received by the audio circuit 606 and converted into audio data. After being processed by the output processor 608, the audio data is sent to another computer device through the RF circuit 601, or the audio data is output to the memory 602 for further processing. The audio circuitry 606 may also include an earphone jack to provide communication of peripheral headphones with the computer device.

Wi-Fi is a short-distance wireless transmission technology. Through the Wi-Fi module 607, the computer device can help the user to send and receive emails, browse the web, access streaming media, and the like. It provides users with wireless broadband Internet access. Although FIG. 6 shows a Wi-Fi module 607, it can be understood that it is not an essential component of a computer device. It can be completely omitted according to needs within the scope of not changing the essence of the invention.

The processor 608 is the control center of the computer device, and uses various interfaces and lines to connect various parts of the entire mobile phone. By running or executing software programs and/or modules stored in the memory 602 and calling data stored in the memory 602, various functions of the computer device are performed and data is processed. Optionally, the processor 608 may include one or more processing cores. Preferably, the processor 608 can integrate an application processor and a modem processor. The application processor mainly handles the operating system, user interface and application programs, etc. The modem processor primarily handles wireless communications. It can be understood that the foregoing modem processor may not be integrated into the processor 608.

The computer device also includes a power supply 609 (such as a battery) for powering various components. Preferably, the power supply can be logically connected to the processor 608 through a power management system, so as to implement functions such as management of charging, discharging, and power consumption management through the power management system. The power supply 609 may also include one or more DC or AC power supplies, recharging systems, power failure detection circuits, power converters or inverters, power status indicators and other arbitrary components.

Although not shown, the computer device may also include a camera, a Bluetooth module, etc., which will not be repeated here. Specifically, in this embodiment, the processor 608 in the computer device loads the executable file corresponding to the process of one or more application programs into the memory 602 according to the following instructions, and the application program stored in the memory 602 is run by the processor 608, thereby realizing various functions, as follows:

obtaining a random number set and a data mapping information, wherein the random number set comprises a plurality of random numbers, and the data mapping information is determined based on a preset device information of an electronic device;

mapping the random numbers in the random number set based on the data mapping information to obtain a first encryption key;

obtaining a data description information of data to be encrypted, and performing operations on the data description information based on the first encryption key to obtain an encrypted description information;

mapping the data description information based on the data mapping information to obtain a second encryption key;
using the first encryption key and the second encryption key to perform operations on the data to be encrypted to obtain an initial encrypted data; and
generating an encrypted data corresponding to the data to be encrypted based on the random number set, the encrypted description information, and the initial encrypted data.

Those skilled in the art can understand that all or part of the steps in the various methods of the above embodiments can be completed by instructions, or by instructions controlling related hardware. The instructions can be stored in a computer-readable storage medium and loaded and executed by a processor.

To this end, an embodiment of the present invention provides a computer-readable storage medium in which a plurality of instructions are stored, and the instructions can be loaded by a processor to perform the steps in any data encryption method provided by the embodiments of the present invention. For example, the command can perform the following steps:
obtaining a random number set and a data mapping information, wherein the random number set comprises a plurality of random numbers, and the data mapping information is determined based on a preset device information of an electronic device;
mapping the random numbers in the random number set based on the data mapping information to obtain a first encryption key;
obtaining a data description information of data to be encrypted, and performing operations on the data description information based on the first encryption key to obtain an encrypted description information;
mapping the data description information based on the data mapping information to obtain a second encryption key;
using the first encryption key and the second encryption key to perform operations on the data to be encrypted to obtain an initial encrypted data; and
generating an encrypted data corresponding to the data to be encrypted based on the random number set, the encrypted description information, and the initial encrypted data.

For the specific implementation of the above operations, reference may be made to the foregoing embodiments, and details are not repeated here.

The computer-readable storage medium may include: a read only memory (ROM), a random access memory (RAM), a magnetic disk or an optical disk, and the like.

The instructions stored in the computer-readable storage medium can execute the steps in any data encryption method provided by the embodiments of the present invention. Therefore, the beneficial effects that can be achieved by any data encryption method provided by the embodiments of the present invention can be realized. See the previous embodiments for details, and details are not repeated here.

According to an aspect of the present application, a computer program product or computer program is also provided. The computer program product or computer program comprises computer instructions. The computer instructions are stored on a computer readable storage medium. A processor of a computer device reads the computer instructions from a computer readable storage medium. The processor executes the computer instructions, so that the computer device executes the methods provided in various optional implementation manners in the foregoing embodiments.

A data encryption method, device, computer device, and storage medium provided by the embodiments of the present invention are described above in detail. In this description, specific examples are used to illustrate the principle and implementation of the present invention. The descriptions of the above embodiments are only used to help understand the method and core idea of the present invention. Further, for those skilled in the art, according to the idea of the present invention, there will be changes in the specific implementation and application range. In summary, the contents of this specification should not be construed as limiting the present invention.

What is claimed is:

1. A data encryption method, comprising:
obtaining a random number set and a data mapping information, wherein the random number set comprises a plurality of random numbers, and the data mapping information is determined based on a preset device information of an electronic device;
mapping the random numbers in the random number set based on the data mapping information to obtain a first encryption key;
obtaining a data description information of data to be encrypted, and performing operations on the data description information based on the first encryption key to obtain an encrypted description information;
mapping the data description information based on the data mapping information to obtain a second encryption key;
using the first encryption key and the second encryption key to perform operations on the data to be encrypted to obtain an initial encrypted data; and
generating an encrypted data corresponding to the data to be encrypted based on the random number set, the encrypted description information, and the initial encrypted data.

2. The data encryption method of claim 1, wherein obtaining the random number set comprises:
obtaining a data encryption time of the data to be encrypted, and generating a random number sequence based on the data encryption time; and
selecting a target random number from the random number sequence based on a preset random number selection rule to generate the random number set.

3. The data encryption method of claim 1, wherein the data to be encrypted comprises at least one data packet to be encrypted, and the data description information comprises a data packet identifier of the data packet to be encrypted;
wherein mapping the data description information based on the data mapping information to obtain the second encryption key comprises:
from the data to be encrypted, determining a target data packet to be encrypted that is currently being encrypted; and
mapping the data packet identifier of the target data packet to be encrypted based on the data mapping information to obtain the second encryption key corresponding to the target data packet to be encrypted;
wherein using the first encryption key and the second encryption key to perform the operations on the data to be encrypted to obtain the initial encrypted data comprises:

performing operation on the target data packet to be encrypted by using the first encryption key and the second encryption key to obtain the initial encrypted data packet;

returning to the operation of from the data to be encrypted, determining the target data packet to be encrypted that is currently being encrypted until all the data packets to be encrypted in the data to be encrypted correspond to a location of the initial encrypted data package; and generating the initial encrypted data based on each of the initial encrypted data packets.

4. The data encryption method of claim 1, wherein before generating the encrypted data corresponding to the data to be encrypted based on the random number set, the encrypted description information, and the initial encrypted data, the method further comprises:

counting a data length of the data to be encrypted, and obtaining a preset transmission test information;

wherein generating the encrypted data corresponding to the data to be encrypted based on the random number set, the encrypted description information, and the initial encrypted data comprises:

performing information splicing based on the random number set, the encrypted description information, the initial encrypted data, the data length, and the transmission test information to generate the encrypted data corresponding to the data to be encrypted.

5. The data encryption method of claim 1, further comprising:

transmitting the encrypted data to a data receiving device, triggering the data receiving device to decrypt the encrypted description information and the initial encrypted data based on the random number set in the encrypted data to obtain the data to be encrypted.

6. The data encryption method of claim 1, wherein the data mapping information comprises a data mapping sub-information of at least one byte, and mapping the random numbers in the random number set based on the data mapping information to obtain the first encryption key comprises:

determining a bit value sequence corresponding to the random numbers in the random number set;

dividing the bit value sequence based on a number of bytes of the data mapping information to obtain at least one bit value subsequence; and calculating a mapping value corresponding to each bit value subsequence, selecting the data mapping sub-information under the byte corresponding to the mapping value from the data mapping information, and generating the first encryption key.

7. The data encryption method of claim 1, wherein the data description information comprises a serial number of a sub-packet of the data to be encrypted, the data mapping information comprises a data mapping sub-information of at least one byte, and mapping the data description information based on the data mapping information to obtain the second encryption key comprises:

determining a bit value sequence of the serial number of the sub-packet;

dividing the bit value sequence based on a number of bytes of the data mapping information to obtain at least one bit value subsequence; and calculating a mapping value corresponding to each bit value subsequence, selecting the data mapping sub-information under the byte corresponding to the mapping value from the data mapping information, and generating the second encryption key.

8. The data encryption method of claim 1, wherein the first encryption key comprises at least one byte of first encryption key data, and the data description information comprises at least one byte of description information data;

performing the operations on the data description information based on the first encryption key to obtain the encrypted description information comprises:

performing XOR calculation on the first encryption key data of each byte in the first encryption key and the description information data in each byte of the data description information to obtain an XOR operation result; and generating the encrypted description information based on the XOR operation result.

9. The data encryption method of claim 1, wherein the first encryption key comprises at least one byte of first encryption key data, and the second encryption key comprises at least one byte of second encryption key data;

using the first encryption key and the second encryption key to perform the operations on the data to be encrypted to obtain the initial encrypted data comprises:

performing XOR calculation on the first encryption key data of each byte in the first encryption key and the second encryption key data of each byte in the second encryption key respectively with the data of each byte in the data to be encrypted to obtain the XOR operation result; and generating the encrypted description information based on the XOR operation result.

10. A data encryption device, comprising:

an information acquirer configured to obtain a random number set and a data mapping information, wherein the random number set comprises a plurality of random numbers, and the data mapping information is determined based on a preset device information of an electronic device;

a first encryption key generator configured to map the random numbers in the random number set based on the data mapping information to obtain a first encryption key;

a first encryptor configured to obtain a data description information of data to be encrypted, and perform operations on the data description information based on the first encryption key to obtain an encrypted description information;

a second encryption key generator configured to map the data description information based on the data mapping information to obtain a second encryption key;

a second encryptor configured to use the first encryption key and the second encryption key to perform operations on the data to be encrypted to obtain an initial encrypted data; and a data generator configured to generate an encrypted data corresponding to the data to be encrypted based on the random number set, the encrypted description information, and the initial encrypted data.

11. The data encryption device of claim 10, wherein the information acquirer is configured to: obtain a data encryption time of the data to be encrypted, and generate a random number sequence based on the data encryption time; and select a target random number from the random number sequence based on a preset random number selection rule to generate the random number set.

12. The data encryption device of claim 10, wherein the data to be encrypted comprises at least one data packet to be encrypted, and the data description information comprises a data packet identifier of the data packet to be encrypted;
   wherein the second encryption key generator is configured to:
   from the data to be encrypted, determine a target data packet to be encrypted that is currently being encrypted; and
   map the data packet identifier of the target data packet to be encrypted based on the data mapping information to obtain the second encryption key corresponding to the target data packet to be encrypted;
   wherein the second encryptor is configured to:
   perform operation on the target data packet to be encrypted by using the first encryption key and the second encryption key to obtain the initial encrypted data packet;
   return to the operation of from the data to be encrypted, determining the target data packet to be encrypted that is currently being encrypted until all the data packets to be encrypted in the data to be encrypted correspond to a location of the initial encrypted data package; and
   generate the initial encrypted data based on each of the initial encrypted data packets.

13. The data encryption device of claim 10, further comprising an additional information acquirer configured to count a data length of the data to be encrypted, and obtaining a preset transmission test information;
   wherein the data generator is configured to perform information splicing based on the random number set, the encrypted description information, the initial encrypted data, the data length, and the transmission test information to generate the encrypted data corresponding to the data to be encrypted.

14. The data encryption device of claim 10, further comprising a data transmitter configured to transmit the encrypted data to a data receiving device to trigger the data receiving device to decrypt the encrypted description information and the initial encrypted data based on the random number set in the encrypted data to obtain the data to be encrypted.

15. The data encryption device of claim 10, wherein the first encryption key generator is configured to: determine a bit value sequence corresponding to the random numbers in the random number set;
   divide the bit value sequence based on a number of bytes of the data mapping information to obtain at least one bit value subsequence; and
   calculate a mapping value corresponding to each bit value subsequence, select the data mapping sub-information under the byte corresponding to the mapping value from the data mapping information, and generate the first encryption key.

16. The data encryption device of claim 10, wherein the first encryption key comprises at least one byte of first encryption key data, and the data description information comprises at least one byte of description information data;
   the first encryptor is configured to: perform XOR calculation on the first encryption key data of each byte in the first encryption key and the description information data in each byte of the data description information to obtain an XOR operation result; and
   generate the encrypted description information based on the XOR operation result.

17. The data encryption device of claim 10, wherein the first encryption key comprises at least one byte of first encryption key data, and the second encryption key comprises at least one byte of second encryption key data;
   the second encryptor is configured to: perform XOR calculation on the first encryption key data of each byte in the first encryption key and the second encryption key data of each byte in the second encryption key respectively with the data of each byte in the data to be encrypted to obtain the XOR operation result; and
   generate the encrypted description information based on the XOR operation result.

18. A computer device, comprising:
   a memory and a processor; wherein the memory stores an application program, and the processor is configured to run the application program in the memory to perform a data encryption method, wherein the data encryption method comprises:
   obtaining a random number set and a data mapping information, wherein the random number set comprises a plurality of random numbers, and the data mapping information is determined based on a preset device information of an electronic device;
   mapping the random numbers in the random number set based on the data mapping information to obtain a first encryption key;
   obtaining a data description information of data to be encrypted, and performing operations on the data description information based on the first encryption key to obtain an encrypted description information;
   mapping the data description information based on the data mapping information to obtain a second encryption key;
   using the first encryption key and the second encryption key to perform operations on the data to be encrypted to obtain an initial encrypted data; and
   generating an encrypted data corresponding to the data to be encrypted based on the random number set, the encrypted description information, and the initial encrypted data.

19. The computer device of claim 18, wherein obtaining the random number set comprises:
   obtaining a data encryption time of the data to be encrypted, and generating a random number sequence based on the data encryption time; and
   selecting a target random number from the random number sequence based on a preset random number selection rule to generate the random number set.

20. The computer device of claim 18, wherein the data to be encrypted comprises at least one data packet to be encrypted, and the data description information comprises a data packet identifier of the data packet to be encrypted;
   wherein mapping the data description information based on the data mapping information to obtain the second encryption key comprises:
   from the data to be encrypted, determining a target data packet to be encrypted that is currently being encrypted; and
   mapping the data packet identifier of the target data packet to be encrypted based on the data mapping information to obtain the second encryption key corresponding to the target data packet to be encrypted;
   wherein using the first encryption key and the second encryption key to perform the operations on the data to be encrypted to obtain the initial encrypted data comprises:

performing operation on the target data packet to be encrypted by using the first encryption key and the second encryption key to obtain the initial encrypted data packet;

returning to the operation of from the data to be encrypted, determining the target data packet to be encrypted that is currently being encrypted until all the data packets to be encrypted in the data to be encrypted correspond to a location of the initial encrypted data package; and generating the initial encrypted data based on each of the initial encrypted data packets.

* * * * *